US009695711B2

(12) United States Patent
Schaefer

(10) Patent No.: US 9,695,711 B2
(45) Date of Patent: Jul. 4, 2017

(54) EXHAUST-GAS TURBOCHARGER

(75) Inventor: Wolfram Schaefer, Kleinkarlbach (DE)

(73) Assignee: BorgWarner Inc., Auburn Hills, MI (US)

( * ) Notice: Subject to any disclaimer, the term of this patent is extended or adjusted under 35 U.S.C. 154(b) by 1188 days.

(21) Appl. No.: 13/812,893

(22) PCT Filed: Jul. 22, 2011

(86) PCT No.: PCT/US2011/044954
§ 371 (c)(1), (2), (4) Date: Jan. 29, 2013

(87) PCT Pub. No.: WO2012/018553
PCT Pub. Date: Feb. 9, 2012

(65) Prior Publication Data

US 2013/0129502 A1 May 23, 2013

(30) Foreign Application Priority Data

Aug. 3, 2010 (DE) ........................ 10 2010 033 200

(51) Int. Cl.
*F02C 6/12* (2006.01)
*F01D 25/24* (2006.01)
*F04D 29/40* (2006.01)

(52) U.S. Cl.
CPC ........ *F01D 25/243* (2013.01); *F05D 2220/40* (2013.01)

(58) Field of Classification Search
CPC .. F01D 25/243; F04D 29/403; F04D 29/4206; F02C 6/12
USPC ............................................... 415/204, 214.1
See application file for complete search history.

(56) References Cited

U.S. PATENT DOCUMENTS 4,235,484 A * 11/1980 Owen .................. F01D 25/166 184/6.11
4,820,118 A * 4/1989 Yano .................... F01D 17/165 415/161
4,969,805 A * 11/1990 Romeo .................. F01D 25/24 417/360
5,210,945 A * 5/1993 Suzuki ................... B23P 11/00 29/889.2

(Continued)

FOREIGN PATENT DOCUMENTS

DE 102008049093 A1 * 4/2010 .............. F02B 37/02
FR 2897893 A1 * 8/2007 ............. F01N 13/10

*Primary Examiner* — Sean J Younger
(74) *Attorney, Agent, or Firm* — Eric L. Doyle; Stephan A. Pendorf; Patent Central LLC

(57) ABSTRACT

An exhaust-gas turbocharger (1) having a turbine housing (2), a compressor housing (3), a bearing housing (4) which has a bearing housing axis (L), and a connecting device (5) for connecting the bearing housing (4) to the turbine housing (2) and/or to the compressor housing (3). The connecting device has a multiplicity of screws (6), a number of screw holes (7, 7') in the bearing housing (4) corresponding to the number of screws (6), and in the turbine housing (2) and/or in the compressor housing (3) a number of threaded holes (8) corresponding to the number of screws (6). The screw holes (7, 7'), the threaded holes (8) and the screws (6) are arranged at an acute angle (α) with respect to a joining surface (9) between the bearing housing (4) and the turbine housing (2) or between the bearing housing (4) and the compressor housing (3).

8 Claims, 4 Drawing Sheets

(56) References Cited

U.S. PATENT DOCUMENTS

Figure 1:
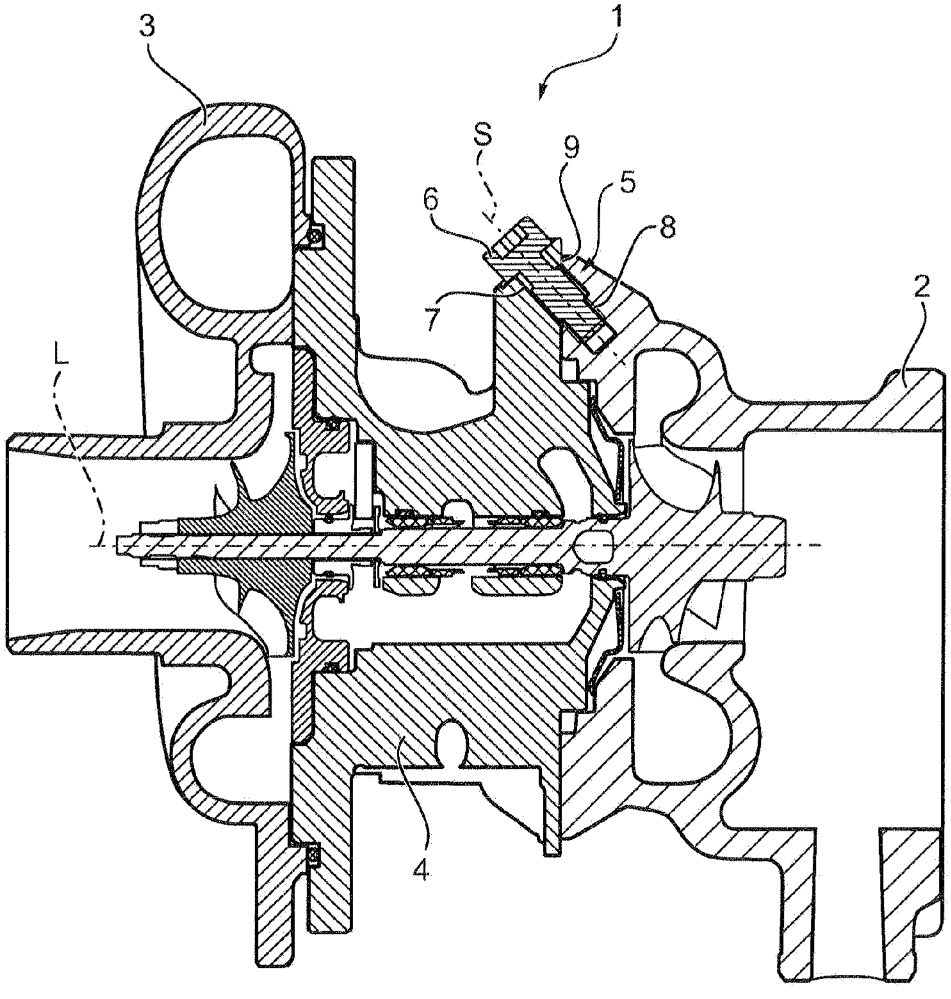

| | | | | |
|---|---|---|---|---|
| 5,406,796 | A * | 4/1995 | Hiereth | F02B 37/005 60/605.2 |
| 6,793,468 | B2 * | 9/2004 | Ojima | F01D 25/166 148/434 |
| 6,928,816 | B2 * | 8/2005 | Leavesley | F01D 17/14 415/158 |
| 7,134,836 | B2 * | 11/2006 | Scherrer | F01D 11/005 415/112 |
| 2007/0169747 | A1 * | 7/2007 | Shimizu | F01D 25/12 123/434 |
| 2007/0175216 | A1 * | 8/2007 | Kobayashi | F01D 17/165 60/605.2 |
| 2008/0223956 | A1 * | 9/2008 | Jinnai | F01D 17/165 239/265.35 |
| 2008/0304990 | A1 * | 12/2008 | Andersen | F04C 28/125 418/19 |
| 2009/0056681 | A1 * | 3/2009 | Shibui | F02B 37/04 123/559.1 |

* cited by examiner

EXHAUST-GAS TURBOCHARGER

The invention relates to an exhaust-gas turbocharger according to the preamble of claim 1.

In a generic exhaust-gas turbocharger, for a direct connection of the bearing housing to the turbine housing and/or to the compressor housing, the screws of a connecting device for the purpose of a direct screw connection are arranged, perpendicular to the joining surface between the housings, on a hole circle. The screws thus generate clamping of the components perpendicular to the joining surface.

However, such a direct screw connection often yields problems in practice on account of poor accessibility of the screws, wherein such a connecting device is not possible in particular in the case of small hole circle diameters.

It is therefore an object of the present invention to provide an exhaust-gas turbocharger of the type specified in the preamble of claim 1 which permits reduced assembly expenditure for the connection of the bearing housing to the compressor housing and/or to the turbine housing.

Said object is achieved by means of the features of claim 1.

As a result of the inclination of the screws and threaded holes, and in the final assembled state of the screws, an arrangement of the screw holes, of the threaded holes and of the screws at an angle and diametrically on an imaginary conical surface is obtained instead of the above-explained arrangement at right angles on a cylindrical surface, which not only achieves the object but also offers the advantage that the screw head contact surface can be easily machined on account of the improved accessibility.

Furthermore, it is achieved that the screws can be mounted easily and that screws can be used which have a hexagon socket and a so-called torx socket, which is a specific embodiment of a hexagon socket.

Furthermore, the advantage is attained that the assembly of the exhaust-gas turbocharger housing can be automated when implemented on the compressor and turbine sides, because the same screw-in direction is possible.

Furthermore, the inclination of the threaded holes in the turbine housing and compressor housing yields a reduction in axial installation space.

Finally, the inclination makes clamping of the components in the axial and radial directions possible.

Subclaims 2 to 4 relate to advantageous refinements of the exhaust-gas turbocharger according to the invention.

Claims 5 and 6 define a bearing housing according to the invention as an independently marketable object.

Figure 2:
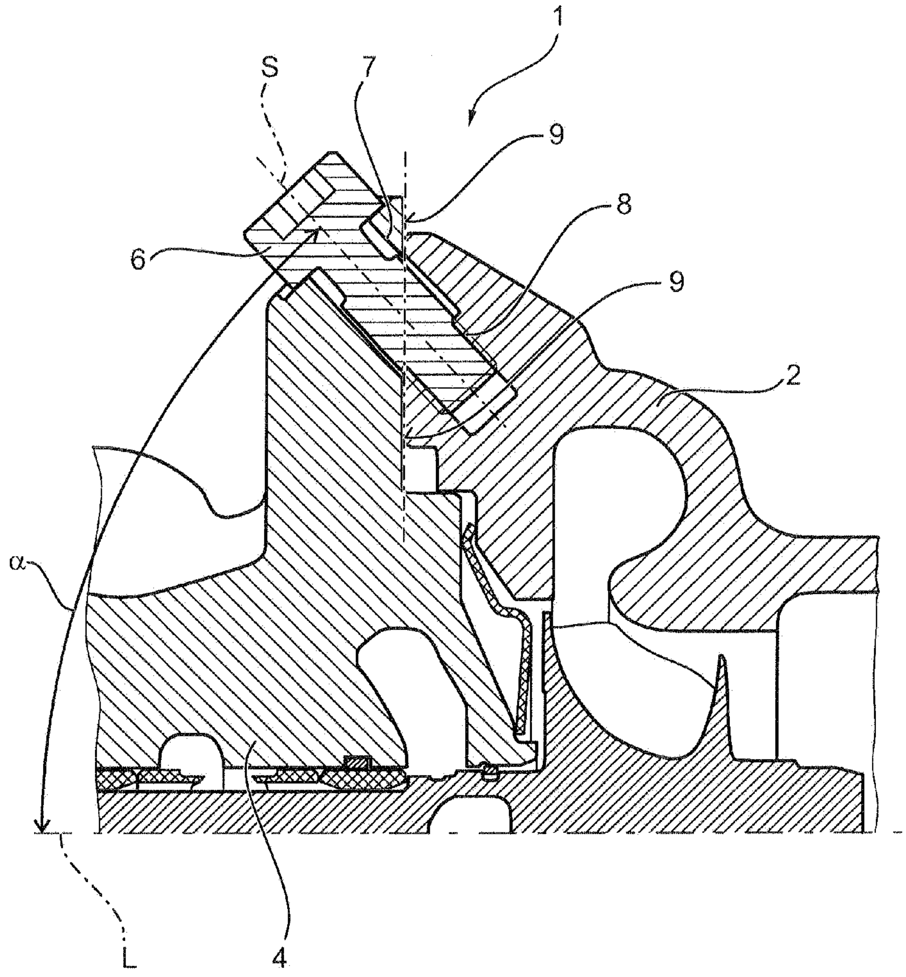
Figure 3:
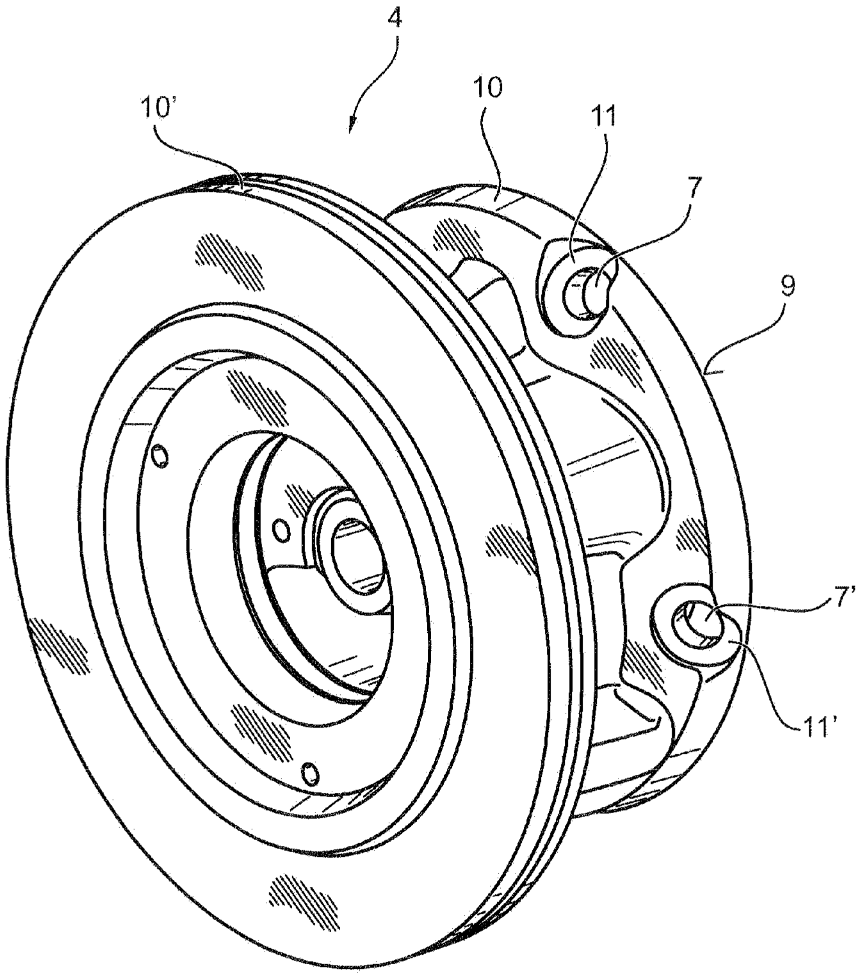
Figure 4:
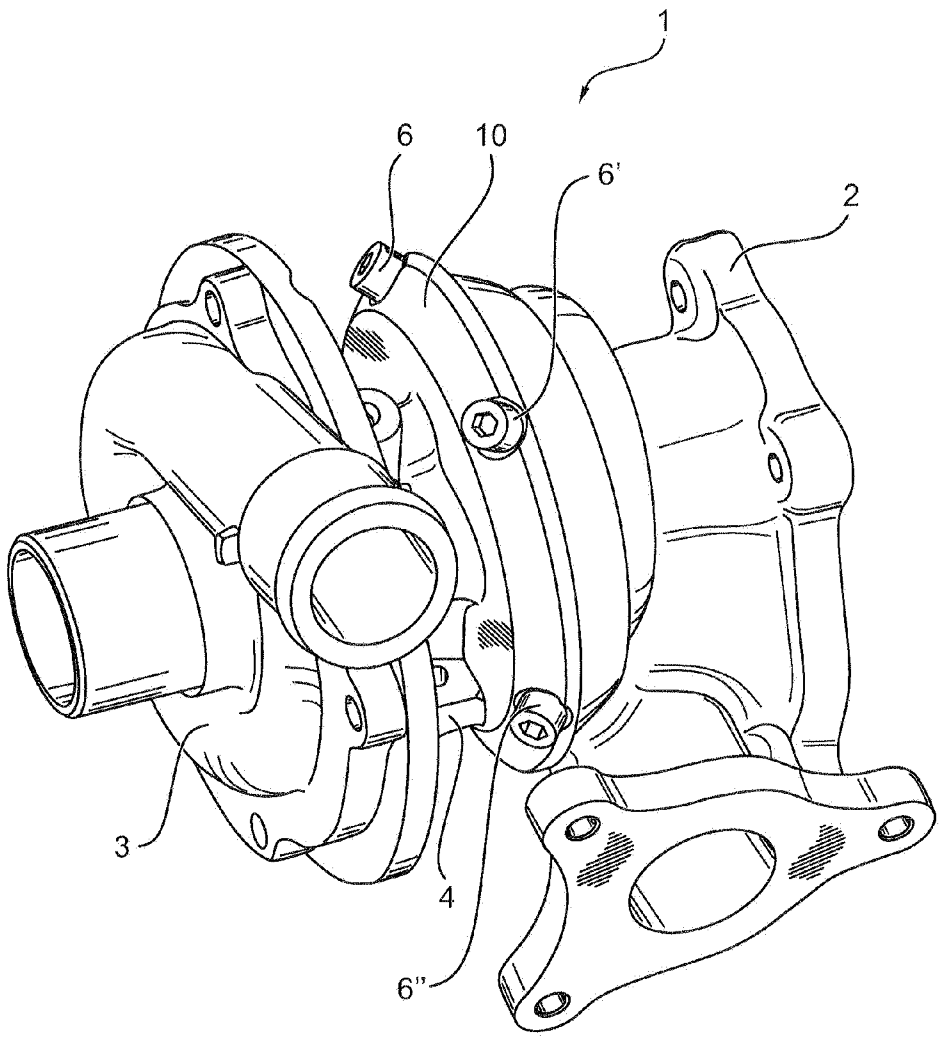

Further details, advantages and features of the present invention will emerge from the following description of exemplary embodiments on the basis of the drawing, in which:

FIG. 1 shows a schematically slightly simplified illustration of an exhaust-gas turbocharger according to the invention, FIG. 2 shows an enlarged illustration of the bearing housing of the exhaust-gas turbocharger, mounted on the turbine housing, in the region of a joining surface, FIG. 3 shows a perspective illustration of a bearing housing according to the invention, and FIG. 4 shows a perspective illustration of the assembled exhaust-gas turbocharger according to the invention.

The exhaust-gas turbocharger 1 has, according to FIG. 1, a turbine housing 2, a compressor housing 3 and a bearing housing 4. The exhaust-gas turbocharger 1 according to the invention self-evidently also has all the other conventional components of modern turbochargers, but these are not described below or illustrated in FIG. 1 because they are not required for explaining the principles of the present invention.

The bearing housing 4 may be connected either to the turbine housing 2 or to the compressor housing 3, or to both the turbine housing 2 and also to the compressor housing 3, by means of a connecting device 5 which has firstly a multiplicity of screws, of which one screw 6 is illustrated representatively in FIG. 1.

Furthermore, the connecting device 5 has in the bearing housing 4 a number of screw holes 7 corresponding to the number of screws 6 used, and in the turbine housing 2 and/or in the compressor housing 3 a number of threaded holes 8 corresponding to the number of screws 6 used. In FIG. 1, again, the screw hole 7 and the threaded hole 8 are illustrated representatively of all the screw holes and threaded holes provided.

As shown in FIG. 1, in the assembled state in the illustrated example of FIG. 1, a joining surface 9 is arranged between the bearing housing 4 and the turbine housing 2, which joining surface is perpendicular to the charger axis L. As is also shown in particular by FIG. 2, the screw holes 7 and the threaded holes 8 and consequently the screws 6 inserted into said holes are inclined, which means that they are arranged at an acute angle $\alpha$ with respect to the joining surface 9. They are therefore not perpendicular to the joining surface 9 or axially parallel to the charger axis L, as in the prior art, but rather are at an angle, wherein the resulting acute angle is denoted by the reference symbol $\alpha$. FIG. 2 shows that said angle $\alpha$ is defined between the common longitudinal axis S of the screw holes 7 and threaded holes 8 and of the screws 6 and the charger axis or bearing housing axis L. Preferred angle dimensions for the angle $\alpha$ are accordingly between 25° and 65°. A particularly preferred angle range is 45°±15°, that is to say between 30° and 60°.

Said angled arrangement results preferably in a symmetrical arrangement, provided on an imaginary conical surface, of the axes of the screw holes 7 and threaded holes 8 and of the screws 6. This in turn yields the facility, explained in the introduction, for the radial and axial clamping of the components, the magnitude and direction of which clamping is dependent on the angle of inclination $\alpha$ of the axis S relative to the joining surface 9.

FIG. 3 shows the bearing housing 4 according to the invention, as an independently marketable object, in a perspective illustration. In the example, the bearing housing 4 has a fastening flange 10 which is provided with the screw holes, of which the screw holes 7 and 7' are illustrated by way of example for all the screw holes. Here, FIG. 3 shows that the screw holes 7, 7' are arranged in the fastening flange 10 so as to be spaced apart from one another in the circumferential direction. The reference numeral 9 again indicates the joining surface or the contact surface against which, in the assembled state, the associated flange of the turbine housing 2 or the associated flange of the bearing housing 3 bears if both housings 2 and 3 are connected to the bearing housing 4 by means of a screw connection. In principle, it is consequently possible for both the compressor housing 3 and the turbine housing 2, or alternatively only one of the two housings 2 or 3, to be connected to the bearing housing 4 by means of the associated screw connection 5.

In the case of FIG. 3, the bearing housing 4 would be provided only for a connection to the turbine housing 2 by means of the described connecting device 5 with screws 6, because screw holes 7, 7' are provided only in the fastening flange 10. If the compressor housing 3 is also to be connected to the bearing housing 4 by means of the connecting device 5 with screws 6, it would be necessary for a suitable number of screw holes to be provided correspondingly in the opposite fastening flange 10'.

FIG. 3 also shows that, as a result of the inclination of the screw holes 7, 7', the screw contact surfaces 11 and 11' are easily accessible despite the opposite fastening flange 10', such that said screw contact surfaces 11, 11' can be produced, for example countersunk, in a simple manner.

FIG. 4 additionally shows the assembled exhaust-gas turbocharger 1 in a perspective illustration.

Aside from the above written disclosure of the invention, reference is hereby made explicitly to the diagrammatic illustration thereof in FIGS. 1 to 4.

LIST OF REFERENCE SYMBOLS

1 Exhaust-gas turbocharger
2 Turbine housing
3 Compressor housing
4 Bearing housing
5 Connecting device
6, 6', 6" Screws
7, 7' Screw holes
8 Threaded holes
9 Joining surface
10, 10' Fastening flanges
11, 11' Screw contact surface
α Angle of inclination between the axis S and the charger or bearing housing axis L
S Axis
L Charger axis/bearing housing axis (longitudinal axis of the exhaust-gas turbocharger 1 or bearing housing 4)

The invention claimed is:

1. An exhaust-gas turbocharger (1) comprising:

a turbine housing (2), a compressor housing (3), a bearing housing (4) which has a bearing housing axis (L), and a connecting device (5) for connecting the bearing housing (4) to the turbine housing (2) and/or to the compressor housing (3), the connecting device (5) comprising a multiplicity of screws (6) provided around the circumference of the bearing housing (4), wherein the bearing housing (4) has a number of screw holes (7, 7') corresponding to the number of screws (6), wherein the turbine housing (2) and/or in the compressor housing (3) has a number of threaded holes (8) corresponding to the number of screws (6), and wherein the screw holes (7, 7'), the threaded holes (8) and the screws (6) are arranged at an acute angle (α) with respect to the bearing housing axis (L)

wherein the axes (S) of the screws (6), of the screw holes (7, 7') and of the threaded holes (8) are arranged on an imaginary conical surface.

2. The exhaust-gas turbocharger as claimed in claim 1, wherein the angle (α) is approximately 25° to 65°.

3. The exhaust-gas turbocharger as claimed in claim 2, wherein the angle (α) is approximately 30° to 60°.

4. The exhaust-gas turbocharger as claimed in claim 1, wherein the screw holes (7, 7') have a machined screw contact surface (11, 11').

5. An exhaust-gas turbocharger (1) comprising:

a turbine housing (2), a compressor housing (3), a bearing housing (4) which has a bearing housing axis (L), and a connecting device (5) for connecting the bearing housing (4) to the turbine housing (2) and/or to the compressor housing (3), the connecting device (5) comprising a multiplicity of screws (6) provided around the circumference of the bearing housing (4), wherein the bearing housing (4) has a number of screw holes (7, 7') corresponding to the number of screws (6), wherein the turbine housing (2) and/or in the compressor housing (3) has a number of threaded holes (8) corresponding to the number of screws (6), wherein the screw holes (7, 7'), the threaded holes (8) and the screws (6) are arranged at an acute angle (α) with respect to the bearing housing axis (L), and wherein the axes (S) of the screws (6), of the screw holes (7, 7') and of the threaded holes (8) are arranged symmetrically on an imaginary conical surface.

6. A bearing housing (4) of an exhaust-gas turbocharger (1), wherein the bearing housing (4) has a bearing housing axis (L), the bearing housing comprising:

at least one fastening flange (10, 10') which has an outwardly pointing joining surface (9), and a multiplicity of screw holes (7, 7') which are arranged, spaced apart from one another in the circumferential direction, on the fastening flange (10, 10'), wherein the screw holes (7, 7') are arranged at an acute angle (α) with respect to the bearing housing axis (L), and wherein the axes (S) of the screws (6), of the screw holes (7, 7') and of the threaded holes (8) are arranged symmetrically on an imaginary conical surface.

7. The bearing housing as claimed in claim 6, wherein the angle (α) is approximately 25° to 65.

8. The bearing housing as claimed in claim 7, wherein the angle (α) is approximately 30° to 60°.

* * * * *